July 5, 1966   M. C. RAY ETAL   3,259,106
PROTEIN FEED BLOCK HOLDER
Filed Oct. 14, 1964
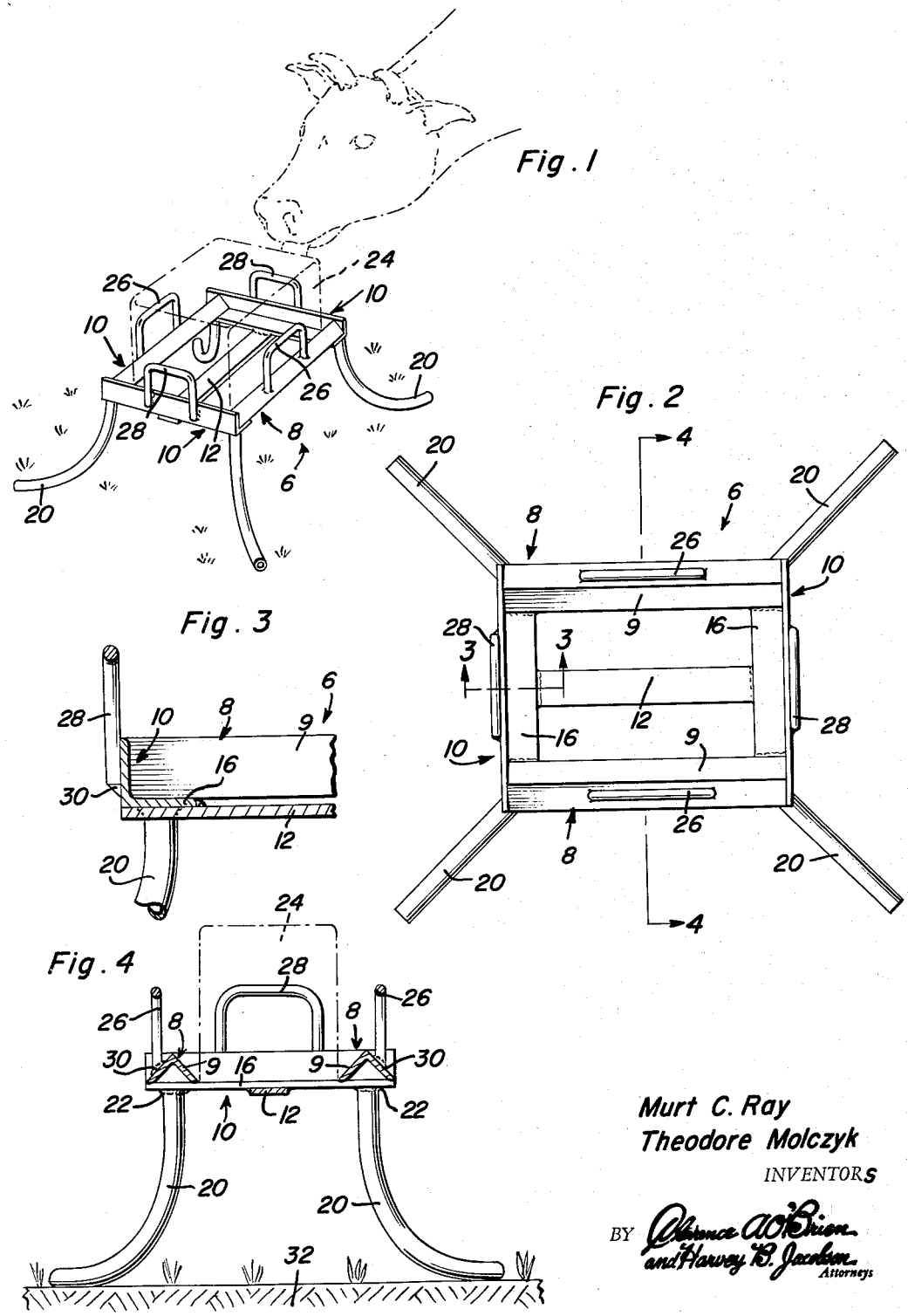
Murt C. Ray
Theodore Molczyk
INVENTORS 3,259,106
PROTEIN FEED BLOCK HOLDER
Murt C. Ray and Theodore Molczyk, Spalding, Nebr.
Filed Oct. 14, 1964, Ser. No. 403,791
2 Claims. (Cl. 119—51)

The present invention relates to new and useful improvements in protein feed block holders particularly for cattle and has for its primary object to provide, in a manner as hereinafter set forth, novel means for firmly supporting such feed blocks in an elevated position out of contact with the ground.

Another highly important object of the invention is to provide a protein feed block holder of the aforementioned character which will be difficult to tip over.

Still another important object of the present invention is to provide an improved protein feed block holder of the character described which will retain no moisture or liquid, thus preventing disintegration of the block from this source.

Another object is to provide a holder of the character described which will promote sanitation in addition to preserving the block and preventing waste.

Other objects are to provide a protein feed block holder for cattle which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, showing a holder embodying the present invention in use;

FIGURE 2 is a top plan view of the device;

FIGURE 3 is a fragmentary view in vertical section on an enlarged scale through an end portion of the device, taken substantially on the line 3—3 of FIGURE 2; and FIGURE 4 is a cross-sectional view through the device, taken substantially on the line 4—4 of FIGURE 2.

Referring now to the drawing in detail, it will be seen that the embodiment of the invention which has been illustrated comprises a generally rectangular, horizontal frame of suitable metal which is generally designated by reference numeral 6. The frame 6, which may also be of any desired dimensions, includes relatively reversed side and end angle bars 8 and 10, respectively. The end portions of the members 8 and 10 are rigidly secured together as by welding. It will be noted that the bars 8 provide inverted V-shaped supports. This arrangement also facilitates welding the bars 8 on the bars 10.

The frame 6 further includes a longitudinal bottom brace 12 in the form of a metallic strap or bar. In the embodiment shown, the end portions of the member 12 are welded to the lower horizontal flanges 16 of the end bars 10.

The frame 6 is firmly supported in an elevated position through the medium of tubular legs 20 of suitable metal. The upper ends of the supporting legs 20 are butt welded, as indicated at 22, beneath the end portions of the horizontal flanges 16 of the end bars 10. The tubular metallic legs 20 are arcuate and it will be noted that said legs extend downwardly and then curve diagonally outwardly in a manner to firmly resist tipping of the holder in all directions.

The frame 6 is adapted to receive and support a protein cattle feed block as indicated at 24 in FIGURE 1 of the drawings. Generally inverted U-shaped, upstanding retaining guards 26 and 28 for the feed block 24 are provided on the outer flanges or legs of the frame members 8 and 10, respectively. The end portions of the retaining guards 26 and 28 are welded to the outer sides of the outer flanges of the members 8 and 10, as indicated at 30.

It is thought that the use of the holder will be readily apparent from a consideration of the foregoing. Briefly, the device may be placed in any suitable location on the ground, as indicated at 32, or other supporting surface. The protein feed block 24 is then placed on the frame 6 between the pairs of guards 26 and 28 in an obvious manner. The block 24, when inserted, may rest on the horizontal flanges 16 of the end bars 10 with the inwardly inclined inner flanges 9 of the side bars 8 functioning as guides.

Also, a somewhat larger block may firmly seat on the flanges 9. The block retainers 26 and 28 are also adapted to function as handles to facilitate handling the holder. It will be observed that the guard 26 and 28 also are tubular. Of course, the dimensions of the holder may vary for feed blocks of various sizes. Also, the device may be used for holding cattle salt or for any other purpose for which it may be found adapted and desirable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cattle feed block holder comprising a frame for receiving and supporting a protein feed block, said frame including end angle bars comprising vertical outer flanges and horizontal inwardly extending lower flanges for receiving the block thereon between said outer flanges, said frame further including inverted V-shaped side bars extending between the end bars and having their end portions resting on and affixed to said lower flanges, supporting legs on the frame, and upstanding inverted U-shaped retaining members for the block mounted on said frame.

2. The combination of claim 1, said legs comprising arcuate tubes having one end secured beneath the corner portions of the frame and extending downwardly and diagonally outwardly therefrom.

References Cited by the Examiner
UNITED STATES PATENTS
1,786,777  12/1930  Pfeiffer _____ 119—51
3,007,443  11/1961  Ryan _____ 119—51

SAMUEL KOREN, Primary Examiner.
HUGH R. CHAMBLEE, Examiner.